UNITED STATES PATENT OFFICE.

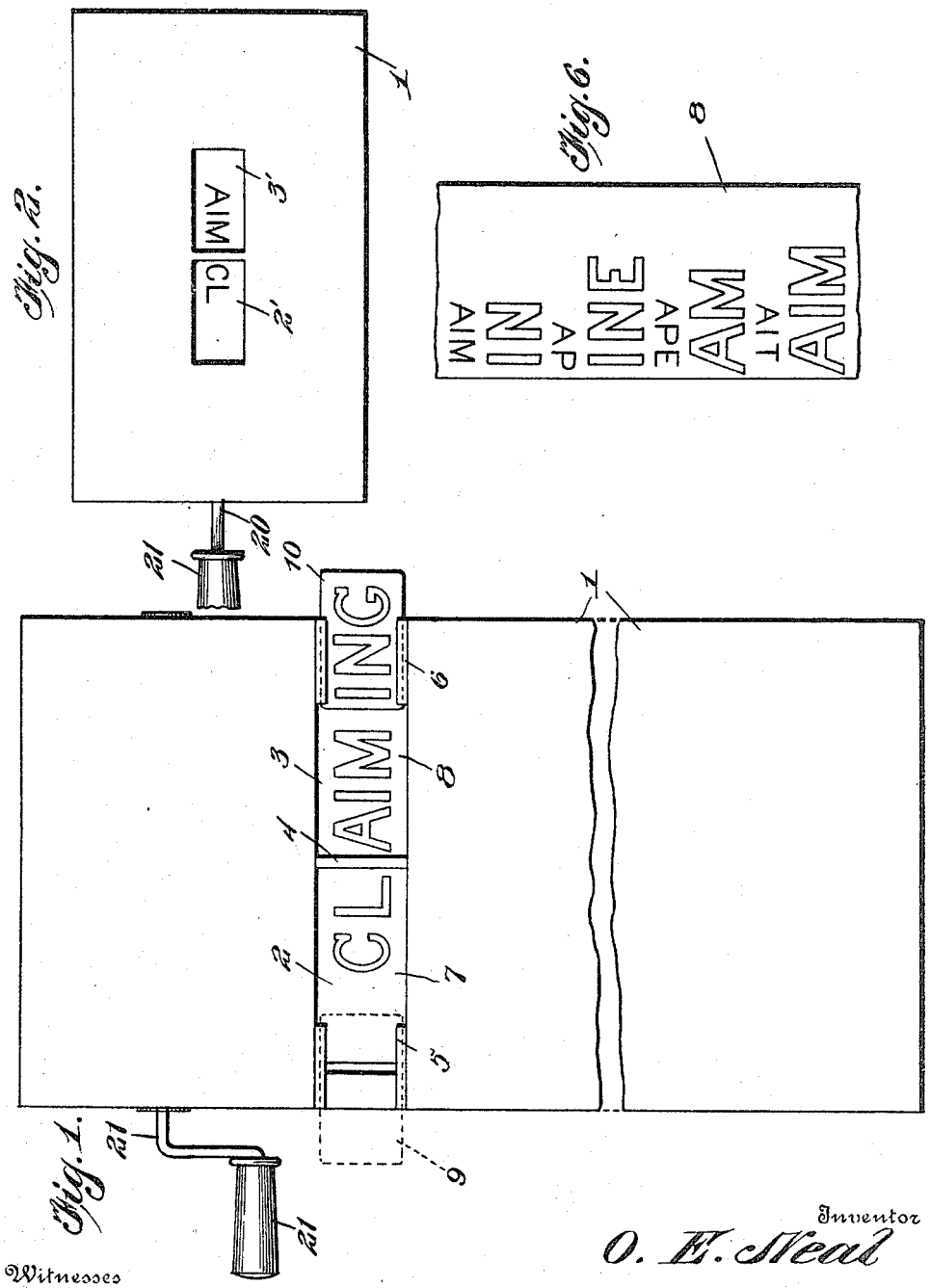

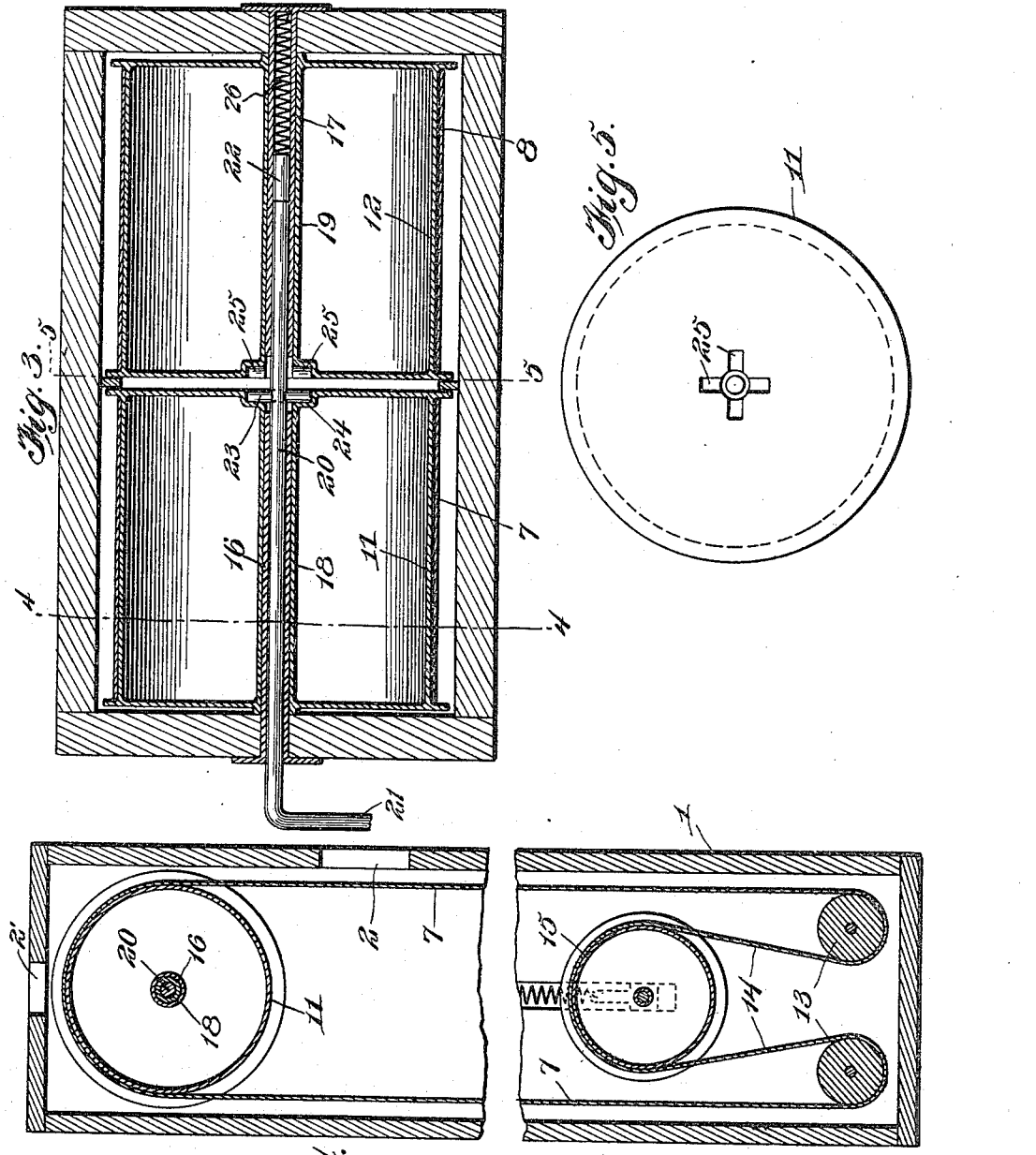

ORVILLE E. NEAL, OF CLEARWATER, NEBRASKA.

EDUCATIONAL DEVICE.

1,209,612.   Specification of Letters Patent.   Patented Dec. 19, 1916.

Application filed March 10, 1916. Serial No. 83,414.

*To all whom it may concern:*

Be it known that I, ORVILLE E. NEAL, a citizen of the United States, residing at Clearwater, in the county of Antelope and State of Nebraska, have invented new and useful Improvements in Educational Devices, of which the following is a specification.

This invention relates to an educational device designed particularly for use in phonic drills or instructions, or other similar educational work, whereby instructions along such lines may be readily and conveniently carried out, with a saving of time and labor and with better results than with the methods heretofore employed, the object of the present invention being to provide a device which embodies these advantages.

The invention consists of the features of construction, combination and arrangement of parts herein fully described and claimed, reference being had to the accompanying drawings in which:—

Figure 1 is a front elevation of an educational device embodying my invention. Fig. 1 is a top plan view of the same. Fig. 3 is a vertical transverse section through the device. Fig. 4 is a vertical front to rear section on the line 4—4 of Fig. 3. Fig. 5 is a detail section on the line 5—5 of Fig. 3. Fig. 6 is a view of a portion of one of the character bearing belts or bands.

In carrying my invention into practice, I provide a vertically disposed casing 1, made of any suitable material, and which is preferably of oblong rectangular form, as shown. This casing is provided in its front with observation openings 2 and 3 separated or not, as desired, by an intervening partition strip 4, which openings are disposed on opposite sides of the vertical center of the front of the casing. Guideways formed of sets of grooved guide strips 5 and 6 are disposed between the sides of the casing and the respective observation openings, for a purpose hereinafter described. Observation openings 2' and 3' separated by a strip 4' are also formed in the top of the casing, for the purpose of exposing matter which is a duplicate of that simultaneously exposed at the openings 2 and 3.

Arranged within the casing are endless belts or webs 7 and 8, of suitable flexible material, the surfaces of which bear matter designed for display through the observation openings for instruction purposes. Thus the belt 7 may bear the consonants and blended consonants which form the first letters of phonetic words, while the belt 8 may bear the vowels and phonograms which form the last or final portions of specimen or sample words. The grooved guideways are intended to hold cards 9 and 10 which may bear the prefixes and suffixes of words, for manifest convenience because of the impossibility of providing elements for disclosing all of the possible prefixes and suffixes without unduly complicating the apparatus. It is to be understood that the belts are to be adjusted to bring any of the consonants or vowels or phonograms thereon into view for various kinds of instruction work in phonetics, in addition to which the cards referred to may be used for the purpose of showing different prefixes or suffixes and for employing the same in conjunction with the vowels and consonants in building or constructing phonetic words.

The belts pass at the top of the casing over drive pulleys 11 and 12 and at the lower end of the casing around spaced sets of guide pulleys 13, arranged in pairs, the pulleys of each pair being disposed one in rear of the other, and each belt being thence looped, as shown at 14, and extended upwardly to a point between the driving rolls and guide rolls and passed around tension pulleys 15.

The drive pulleys 11 and 12 are journaled upon tubular bearing members 16 and 17 and are provided with tubular spindles 18 and 19 which turn upon said bearing members, and journaled in these bearing members is an actuating shaft 20 having at its outer end a crank handle 21. This shaft is mounted for longitudinal sliding as well as rotary movement in the bearing tubes, which latter are spaced at their adjacent ends, and the inner end of the shaft engages a spring pressed sliding follower 22 within the bearing member 17, whereby said shaft is normally maintained in one position. The shaft carries a clutch member in the form of a pin 23, adapted for engagement with clutch recesses or notches 24 and 25 formed in the inner ends of the tubular bearing spindles 18 and 19, so that the shaft may be connected with either one of the driving pulleys for transmitting motion to one or the other of the belts or bands. The follower 22 is acted upon by a spring 26 and presses upon the shaft 20 to hold the clutch pin 23 normally engaged with the spindle of the pulley 11, but by pressing the shaft inwardly against resistance of the spring the clutch pin may be connected for driving action with the spindle of the pulley 12, as will be readily understood.

I claim:—

1. In a device of the character described, a casing having observation openings at different points, traveling belts within the casing bearing main display indicia adapted to be exposed at one of said display openings and duplicate indicia adapted to be simultaneously displayed at the other display openings, and means for imparting motion to said belts.

2. In an apparatus of the character described, a casing provided with display openings, belts movable in parallel planes for travel past said openings, said belts carrying matter to be displayed through the openings, and an operating device common to said belts and operative for transmitting motion to either belt independently of the other.

3. In a device of the character described, a casing provided with observation openings, belts movable in parallel planes past said openings, sets of pulleys for supporting, guiding and driving the belts, one of said sets of pulleys having hollow hubs or sleeves, and a drive shaft movable longitudinally within said hubs or sleeves and provided with a clutch device for independent engagement therewith, whereby either belt may be driven independently of the other.

4. In a device of the character described, a casing having observation openings, a pair of belts bearing matter to be displayed through said openings and movable in parallel relation, an upper set of pulleys for supporting and guiding the belts, a lower set of pulleys for supporting and guiding the belts, the latter-named pulleys being arranged in pairs, with the pulleys of each pair arranged one in rear of the other, and said belt having a portion looped between said pairs of pulleys, tension pulleys around which the looped portions of the belt pass, a spring actuated shaft carrying said pulleys, and means for imparting driving motion to either of the first-named pulleys.

5. In a device of the character described, a casing having observation openings, belts bearing matter to be displayed movable in parallel relation past said openings, lower guiding, supporting and tensioning pulleys for the belts, upper driving, supporting and guiding pulleys for the belts, said upper pulleys being provided with tubular hubs having clutch portions, tubular spindles on the casing on which said hubs turn, a spring pressed follower within one of said spindles, and a shaft journaled in the spindles and provided with a clutch member to engage the clutch portion of the hub of either upper pulley, said shaft being normally held by said follower in clutch engagement with one of said pulleys and being longitudinally movable against the resistance of the follower into clutched engagement with the other spindle.

In testimony whereof I affix my signature in presence of two witnesses.

ORVILLE E. NEAL.

Witnesses:
 THOS. MARWOOD,
 H. D. MILLER.

Copies of this patent may be obtained for five cents each, by addressing the "Commissioner of Patents, Washington, D. C."